L. D. KRINER.
NUT LOCK.
APPLICATION FILED FEB. 12, 1912.
1,040,215.
Patented Oct. 1, 1912.
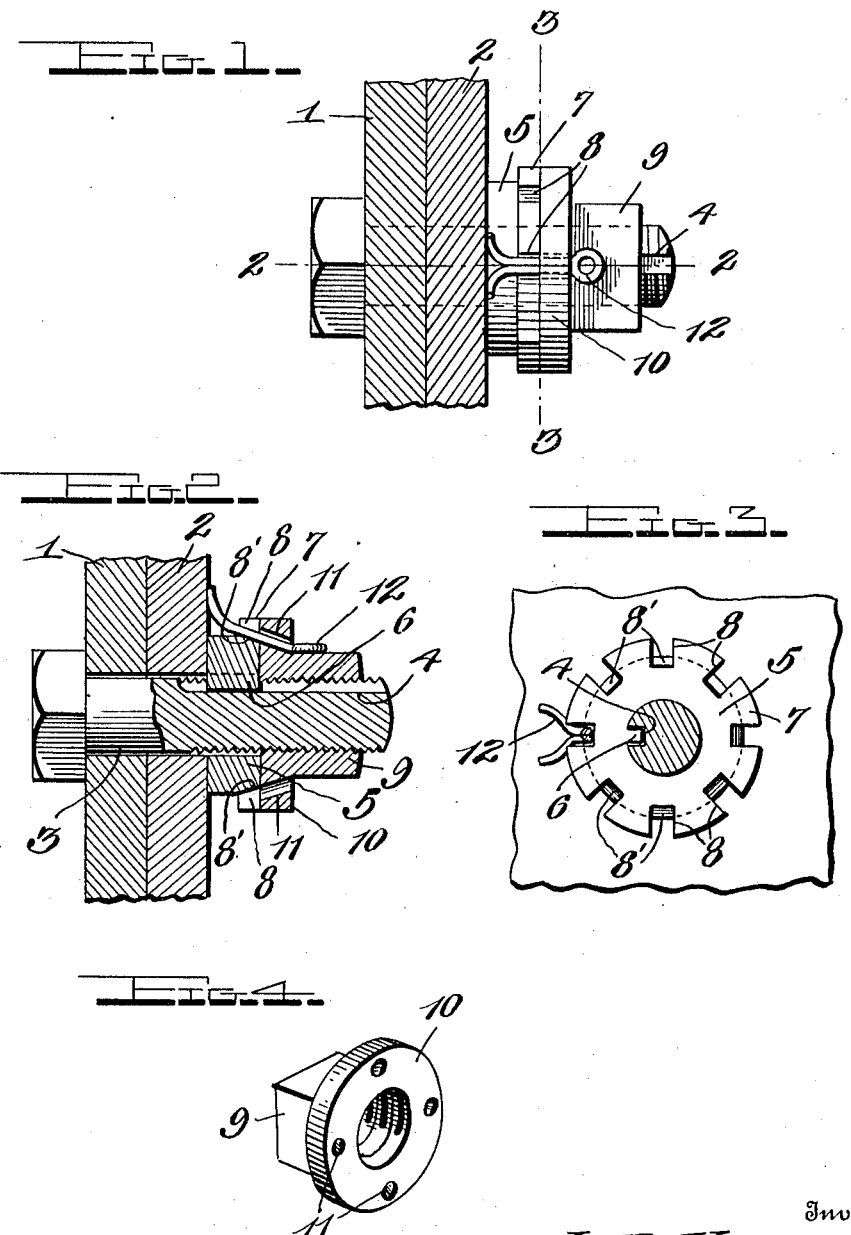
Witnesses
Chas. L. Griesbauer.
G. B. Norton.
Inventor
L. D. Kriner;
By Watson E. Coleman.
Attorney
COLUMBIA PLANOGRAPH CO., WASHINGTON, D. C.

UNITED STATES PATENT OFFICE.

LONZO D. KRINER, OF ALLIANCE, OHIO, ASSIGNOR OF ONE-HALF TO ALLEN V. JOHNSON, OF ALLIANCE, OHIO.

NUT-LOCK.

1,040,215. Specification of Letters Patent. Patented Oct. 1, 1912.

Application filed February 12, 1912. Serial No. 677,244.

*To all whom it may concern:*

Be it known that I, LONZO D. KRINER, a citizen of the United States, residing at Alliance, in the county of Stark and State of Ohio, have invented certain new and useful Improvements in Nut-Locks, of which the following is a specification, reference being had to the accompanying drawings.

My invention relates to new and useful improvements in nut locks and has for its object to provide a simple and efficient device for positively retaining a nut in locked position.

A further object of the invention resides in the provision of a nut having an annular flange with openings therein, and a further object resides in the provision of a washer or the like provided with notches adapted to be alined with the openings of said nut.

Still another object of the invention resides in disposing the openings in the nut at an angle and the inner walls of the notches on the disk at an angle.

A still further object resides in the provision of a key member adapted to be disposed through an opening in the nut and alined notch on the disk.

With these and other objects in view, my invention consists in the novel features of construction, combination and arrangement of parts which will be hereinafter referred to and more particularly pointed out in the specification and claims.

In the accompanying drawings, Figure 1 is a side elevation partly in section showing my improved nut lock applied to use; Fig. 2 is a horizontal section through the same, as seen on the line 2—2 of Fig. 1; Fig. 3 is a transverse section through the device as seen on the line 3—3 of Fig. 1; and Fig. 4 is a perspective view of the nut removed from the device.

In describing my invention I shall refer to the drawing, in which similar reference characters designate corresponding parts throughout the several views, and in which—

1 indicates a solid member such as the web of a rail, and 2 an additional member adapted to be secured thereto such as a fish plate or the like and extending through the alining openings in the members 1 and 2 is a bolt 3 of any desired size such as is used for railway purposes. This bolt is provided for a portion of its length from the free end thereof with a longitudinal groove 4 and adapted to fit over the threaded end of the bolt and to bear against the outer face of the member 2 is a disk or washer 5, said member 5 being provided on the inner periphery thereof with a tongue or projection 6 adapted to enter said groove 4 and prevent rotative movement of the disk on said bolt. The outer face of the washer or disk 5 is projected beyond the periphery of the body portion of the same to form an annular flange or the like therearound as shown at 7 and this flanged portion is provided throughout its periphery with a plurality of notches 8. These notches are arranged at regular intervals on the periphery of the flanged portion 7 and have the inner walls thereof beveled inwardly toward the axial center of the disk from their inner to their outer ends, as shown at 8′, the purpose of which will be hereinafter and more particularly described.

The nut 9 which may be rectangular as shown or otherwise, is engaged with the threaded end of the bolt after the washer or disk 7 is positioned thereon to bind against the latter. The inner face of the nut 9 projects somewhat beyond the body portion of the same to provide an annular flange 10 thereon, the diameter of the inner face of the nut at the flanged portion being substantially equal to the diameter of the outer face of the diameter with its flanged portion thereon, and said flange 10 is provided with a plurality of openings 11 which extend completely therethrough and are arranged at regular intervals thereon. These openings 11 are inclined outwardly from their outer to their inner ends so that when anyone of the same is positioned in registration with the notch 8 in the flange 7 of the disk 5, the one wall of the same will be in substantial alinement with the inclined rear wall of said notch. When the nut has been turned on the bolt to the same point tightly against the washer 5 one of the plurality of openings 11 is adapted to register with one of the plurality of notches 8 and in order to prevent casual disengagement of the nut 9 from the bolt 3, a locking key 12 is provided and adapted to be inserted in the alining notch and opening of the respective disk and nut. This locking key is preferably of the cotter pin type, that is, split and designed arcuately so that the same will readily operate with the inclined opening 11 and beveled wall 8' of the notch 8 and when properly disposed in position, the free ends of the same are spread so as to securely retain the same in position.

In practice, after the bolt has been passed through two members which are to be secured together, the washer or disk 5 is introduced over the free end of the same to contact with the outer face of the one member while the head of the bolt contacts with the outer face of the opposite member. The nut 9 is then threaded into engagement with the threaded end of the bolt and turned home until in binding contact with the outer face of the disk 5. At this point, it will be found that someone of the plurality of inclined openings 11 will register with one of the notches 8 of the disk, whereupon the locking pin 12 may be inserted therethrough and the free ends of the same spread to securely lock the nut in position against casual disengagement. As stated above, this pin 12 is bent or curved arcuately to coöperate with the inclined walls of the openings 11 and inclined walls 8' of the notches, thus providing a more secure retaining means for the nut and it will be seen that when once locked in position, said nut is not adapted to be moved other than by some manual means.

From the foregoing, it will be seen that I have provided a simple, inexpensive and efficient means for carrying out the objects of my invention, and while I have described the elements most well adapted to perform the functions set forth, it is obvious that various changes in the form, proportion and in the minor details of construction may be resorted to without departing from the spirit or sacrificing any of the principles of the invention.

Having thus described my invention, what I claim is:—

1. In a nut lock, the combination with a bolt; of a nut engaged therewith, said nut being provided with a plurality of openings extending therethrough and inclined upwardly toward the rear face thereof, a disk loosely applied on said bolt between the nut and the object to be engaged, said disk being provided with a plurality of peripheral notches, the inner walls of said notches being inclined coincident to the inclination of the walls of said openings and adapted to aline therewith, means to prevent the rotation of said disk on the bolt, and a cotter pin adapted to be introduced through an opening in the nut and an alining notch in the disk to prevent rotation of the former on the bolt.

2. The combination with a bolt; of a nut engaged therewith, said nut being provided on its inner face with a peripheral flange having a plurality of upwardly inclined openings therein, a disk loosely applied on said bolt between the nut and the object to be secured, said disk being provided with a peripheral flange on the outer face thereof to abut the flange of said nut and having a plurality of circumferential notches therein, the inner walls of which are inclined coincident to the inclination of the walls of said openings and adapted to aline therewith, means to prevent the rotation of said disk on the bolt, and a bent cotter pin adapted to be introduced through an opening in the nut and an alining notch in the disk to prevent the rotation of said nut on the bolt.

In testimony whereof I hereunto affix my signature in the presence of two witnesses.

LONZO D. KRINER.

Witnesses:
F. L. MOWRY,
NORMAN W. CLARK.

---

Copies of this patent may be obtained for five cents each, by addressing the "Commissioner of Patents, Washington, D. C."